United States Patent Office 3,409,514
Patented Nov. 5, 1968

3,409,514
METHOD OF PREPARATION OF PURE STRAIGHT-CHAIN PARAFFINIC HYDROCARBONS
Yves Drapeau, Le Havre, and Michel Bestougeff, Eaubonne, France, assignors to Compagnie Francaise de Raffinage, Paris, France
No Drawing. Filed June 26, 1964, Ser. No. 378,436
Claims priority, application France, June 27, 1963, 939,585; June 8, 1964, 977,465
11 Claims. (Cl. 203—48)

The present invention relates to a method which makes it possible to obtain pure straight-chain paraffinic hydrocarbons from mixtures of the latter with other straight-chain paraffinic hydrocarbons of different molecular weights, or alternatively with iso-paraffinic and cyclo-paraffinic hydrocarbons, aromatic hydrocarbons, etc. More precisely, the invention permits of the separation and collection of normal paraffinic hydrocarbons with 12 to 16 atoms of carbon, present in a mixture of hydrocarbons, such as kerosene or gas-oil fractions.

Up to the present time, the separation of normal paraffins from mixtures of hydrocarbons which contain them has been effected by various methods.

One of the best known of these methods consists of treating the mixture of hydrocarbons with urea. The latter forms insoluble complexes by addition on the normal paraffins (hereinafter termed n-paraffins) and the n-paraffins are recovered by decomposition.

Another method of separation of the n-paraffins consists of utilizing molecular sieves. The latter selectively absorb the n-paraffins and do not retain the other hydrocarbon molecules. When the mixture is treated, it is only necessary to liberate the normal paraffins and then to collect them.

It is also known that it is possible to separate the n-paraffins, the iso-paraffins and the naphthenes with 12 to 18 atoms of carbon by fractionated crystallization at very low temperature in a selective solvent, such as acetone or dichloro-ethane. In order to obtain n-paraffins without iso- or cyclo-paraffins, this method makes it necessary, when starting with petroleum mixtures containing 15% to 30% of straight-chain constituents, to carry out the crystallization at a temperature going down to —80° C. As the temperature of crystallization is increased, it becomes necessary, to obtain the same yield, to reduce the rate of dilution or to utilize another solvent; in any case, it is necessary to limit the selectivity of the solvent, and there is obtained a crystallized product which then contains, besides normal paraffins, other hydrocarbons such as iso- and cyclo-paraffins. At the same temperature, the quantity of impurities increases as the solvent is less selective.

It is remarkable that all the known methods of separation of n-paraffins result invariably in a mixture of these n-paraffins with each other, and that the production of any one of these necessitates a further fractionation of the mixture obtained. Furthermore, each of the n-paraffins with a number of carbon atoms comprised between 12 and 16 represents a product which is in demand for organic synthesis, both in the laboratory and in industry. They are the basic products for the manufacture of straight-chain derivatives: olefins, alcohols, amines. They are also utilized for the manufacture of detergents and for the alkylation of aromatic, naphthalenic hydrocarbons, etc.

Finally, it is known to prepare paraffins which are normally solid at ambient temperature, to separate the linear chain constituents from their ramified or cyclic isomers by fractionating the mixture by distillation in fairly narrow sections in order that the number of carbon atoms of their components does not vary by more than 3 or 4 units, and then by subjecting these narrow sections to a fractional crystallization in a molten medium or in solution in an appropriate organic solvent. The normal paraffins, the melting point of which is always higher than that of their isomers present in the narrow section, crystallize-out first by cooling and are separated.

If it is desired to apply this method to the fractionation of mixtures of hydrocarbons—such as kerosene or gas-oil—in order to extract from them the paraffinic hydrocarbons with straight-chains having 12 to 16 atoms of carbon, it is found on the one hand that the fractional distillation no longer presents any difficulty, that it even makes it possible to obtain still more narrow sections such that the straight-chain molecules have substantially the same number of carbon atoms, but on the other hand, that the fractional crystallization must be carried out at very low temperatures, especially if, to increase the selectively of the operation, this latter is carried out in the presence of an organic solvent.

Now, these low temperatures are situated between —40° and —80° C., and present a serious obstacle to the utilization of this method. Petroleum refineries generally have available for their manufacture of lubricating oils, of refrigerating installations operating at temperatures which do not go below —30° C. They cannot therefore be utilized for the method referred to above, and it would be necessary to construct specially for that purpose installations provided with more powerful refrigeration means which are in consequence very expensive.

The present invention overcomes these drawbacks. It has for its object to isolate pure normal paraffins having from 12 to 16 atoms of carbon, from mixtures of hydrocarbons which contain them. A further object of the invention consists of obtaining these paraffins by crystallization at a temperature which is not lower than —30° C., which presents the important advantage of enabling the crystallization to be carried out by means of refrigerating installations employed for the treatment of oils.

Other characteristic features of the invention will be brought out in the description which follows.

Researches made in connection herewith have established that the tempearture required for fractional crystallization of narrow sections depends on the concentration of these latter in n-paraffinic constituents to be separated. If this concentration is higher than a certain threshold value, crystallization can be effected at temperatures equal to or higher than —30° C. with good yields and with the production of pure products containing no more than a single n-paraffinic term entirely free from isomers and from adjacent iso- and/or cyclo-paraffinic terms.

Thus, a narrow section fractionated so as to contain, as far as the linear constituents are concerned, only n-dodecane, can crystallize from —40° C. if the concentration of the n-dodecane in this section is of the order of 40 to 45% by weight.

If by any means the proportion in this section is brought up to 60% by weight or more, then the crystallization can be carried out at —30° C. and higher.

The threshold of concentration, that is to say the minimum characteristic content of n-paraffins in the section subject to crystallization will of course depend on the length of the chain of the n-paraffin to be separated. This threshold value decreases uniformly as and when the number of carbon atoms increases. In the crystallization of n-tetradecane, it is for example 50%. For n-pentadecane, this threshold value is about 35% and for n-hexadecane it is about 25%.

The method in accordance with the present invention thus comprises the following stages:

(1) Fractionation by distillation, in accordance with known means, of a mixture of hydrocarbons containing straight-chain hydrocarbons and ramified or cyclic hydrocarbons in a narrow section containing substantially, as far as the linear constituents are concerned, only a single term, the n-dodecane for example, the said fractionation being effected in such manner that the concentration of this term is higher than a certain threshold value, 60% by weight for example, for n-$C_{12}$.

As will be explained below, and without departing from the invention, according to the means employed, the fractionation by distillation can be carried out in two or more stages if the concentration of the normal paraffinic term has not reached the required threshold at the first stage.

(2) Fractional crystallization of the fraction obtained, in the molten state or in a solvent medium, at a temperature higher than or equal to −30° C., so as to separate out a crystallized product containing nothing but pure n-paraffin, free from other n-paraffins and from any other isomer or neighbouring ramified or cyclic constituent. The crystallized product is then filtered and washed with an organic solvent.

In carrying this method into effect, a charge constituted by a kerosene or gas-oil fraction containing between 10% and 25% of the n-paraffinic hydrocarbon term with $C_{12}$ to $C_{16}$ which it is desired to obtain pure, is subjected to a fractionation by distillation following one of the methods known in industry, for example by means of columns with trays or filling columns.

Depending on the fractionating means employed, depending on the molecular weight of the n-paraffin which it is desired to obtain, and depending on the content of the charge to be treated, the fractionation will be effected in one or more stages. In fact, the necessary threshold of concentration will be attained the more easily as the content of n-paraffin in the section is higher, as the molecular weight is higher and obviously as more powerful fractionating means are available.

In order to obtain pure n-dodecane for example, a fractionation is effected such that middle fraction collected has a boiling inteval with a width less than 8° C. and preferably less than 6° C., containing from 50 to 70% of dodecane.

The crystallization is then carried out according to the number of carbon atoms in the molecule, in the presence of a solvent or without solvent in the mass.

In the case of n-tetradecane for example, the crystallization is effected in the presence of a solvent so as to increase the selectivity. In fact, the difference between the melting point of n-tetradecane and hydrocarbons having an adjacent boiling point is less than the same difference for n-dodecane. The choice of the solvent is determined by its selectivity; it must possess a good solvent power for the other hydrocarbons at the temperature of crystallization and an anti-solvent power for the n-paraffin to be isolated.

The solvents most generally employed are methyl-ethyl-ketone and dichloro-ethane, or a mixture of the two. The weaker solvent is methyl-ethyl-ketone which has the least selectivity but which presents the advantage, for equal rates of dilution, of carrying on the crystallization at a higher temperature than dichloro-ethane.

The rate of dilution, for equal selectivity and for the same temperature, varies as a function of the molecular weight of the n-paraffin. It becomes greater as the molecular weight increases.

It is possible to vary the solvent power by mixing together dichloro-ethane and methyl-ethyl-ketone in varying quantities.

It is also possible to employ other solvents, alone or mixed together in pairs, such as acetone, benzene, tolene or trichloro-ethylene.

The crystallization temperature is comprised between −25° C. and −30° C., that is to say the same temperature as that at which the de-paraffining of oils is effected by methyl-ethyl-ketone. The rate of dilution, which may furthermore be zero when the operation is carried out in a molten medium, enables this crystallization temperature to be varied; similarly, the temperature varies with the composition of the solvent. For cooling, use is made of the well known conventional means employed in the treatment of oils.

The separation of paraffinic hydrocarbons with straight-chains is effected by filtration, for example by a filter press or by a rotary suction filter.

The filter cake thus separated is finally washed with fresh solvent so as to dissolve the small traces of liquid non n-paraffinic hydrocarbons. This washing is carried out at a temperature substantially equal to that of the crystallization; the rate of washing: volume of solvent/volume of charge varies between 1/1 and 5/1.

The putting into practice of the crystallization in the method according to the invention may be effected either in the presence of a solvent or in a molten medium, depending on the charge to be treated, and in particular according to the content in this charge of n-paraffin to be obtained and the molecular weight of this n-paraffin.

In particular:

The n-dodecane which melts at −9.6° C. will be crystallized without solvent. This crystallization is made possible by the fact that the isomers and the other hydrocarbons with 12 atoms of carbon have a melting point which is much lower.

Tridecane and tetradecane which melt respectively at −5.4° C. and +5.4° C. will be crystallized after having dissolved the fraction which contains them in the appropriate solvent: methyl-ethyl-ketone, dichloro-ethane or mixtures of these. For these hydrocarbons and similarly for n-hexadecane, the presence of the solvent has the object of increasing the selectivity of the crystallization. In addition, the adjustment of the rate of solvent to the temperature of crystallization makes it possible to obtain the best yield and the highest possible purity.

The filtrate resulting from crystallization still contains from 30 to 35% of n-paraffin, and it is advantageous to recover this product. It still remains within the scope of the invention to re-cycle this filtrate into the mixture to be treated, which improves the content of n-paraffin in the charge and substantially increases the yield of the process.

In accordance with another characteristic of the invention, it is advantageous to apply the method to petroleum distillates which are previously enriched in straight-chain paraffins by means of a treatment with urea or on molecular sieves. This previous enrichment in n-paraffins by one or the other of these means, of the charges to be treated by the method ensures a very good recuperation of the n-paraffins contained in the petroleum distillates.

The examples given below, which have in no sense a limitative character, illustrate the method of the invention.

EXAMPLE 1

A fraction of the Hassi R'Mel condensate, representing about 6%, has the following characteristics:

| Distillation A.S.T.M.: | ° C. |
| --- | --- |
| Starting point | 204 |
| 50% | 217 |
| Final point | 231 |

It contains 25% of n-paraffins, including 20% of n-dodecane. 2.4 litres of this fraction are introduced into a distillation column and there are collected fractions of 0.5% by weight with respect to the total condensate.

The four fractions thus obtained which are the richest in n-dodecane are then grouped together so as to give 800 cu. cm. (625 grams) of a mixture enriched in n-$C_{12}$, the analysis of which gives the following results:

| | |
|---|---|
| Boiling point ° C | 213 to 221 |
| Content of aromatics percent by weight | 6.5 |
| Content of naphthenes do | 15.5 |
| Content of iso-paraffins do | 36.5 |
| Content of n-paraffins do (n-$C_{12}$) | 41.5 |

This enriched mixture is introduced into a second distillation column equivalent to 75 theoretical trays. There are collected 210 grams of a product representing 33.6% by weight of the charge, or 0.67% of the initial condensate. This product contains 62% of normal dodecane.

By cooling this product in the mass down to $-27°$ C., a crystallization is produced. The crystallized product obtained is washed with methyl-ethyl-ketone at a washing rate of 3/1. After filtration, there are obtained 91 grams of 100% pure normal dodecane.

Pure n-tetradecane is obtained by concentrating a fraction 246–281 (6.6% of the Hassi R'Mel condensate) containing 13.7% of n-$C_{14}$ by the method of the above example, until a fraction is obtained which contains about 50% of this fraction and by crystallizing this fraction dissolved in a mixture of methyl-ethyl-ketone and dichloroethane at $-27°$ C.

EXAMPLE 2

It is proposed to prepare pure n-hexadecane from a residue of the Hassi R'Mel condensate having an initial boiling point of 255° C., and which represents 15.88% of the total condensate.

This residue contains about 0.40% of n-$C_{16}$.

10 kgs. of this residue are separated by fractional distillation in a fraction of 4% by weight, or 400 grams.

The fraction which boils in the range 286°–286.7° C. contains 25.7% of n-hexadecane. Its composition in grams is as follows:

| | |
|---|---|
| Aromatics | 41.6 |
| Naphthenes | 98.8 |
| Total paraffins | 259.6 |
| | 400.0 | of which:

| | |
|---|---|
| n-$C_{15}$ | 1.6 |
| n-$C_{16}$ | 102.8 |
| n-$C_{17}$ | 2.0 |
| n-Paraffins | 106.4 |

This fraction is dissolved in twice its volume of methyl-ethyl-ketone and the solution obtained is cooled to $-27°$ C., at which temperature crystallization of the n-hexadecane takes place.

The crystallized product is subjected to repulping and then to washing with fresh solvent with proportions of solvent (methyl-ethyl-ketone) of 2.5 vol./vol. and 1 vol./vol. of crystallized product respectively.

There are thus collected 100 grams of hexadecane, the degree of purity of which is 98% by weight.

EXAMPLE 3

On a kerosene originating from Iraq and boiling between 185° and 285° C., an extraction with urea is effected in the following manner:

To 5 litres of this kerosene there are added 4 kgs. of urea moistened with 480 grams of methanol, and this is diluted with 10 litres of iso-octane. Stirring is carried out for 3 hours at the ambient temperature and the mixture is then filtered in order to recover the addition product of the paraffins and the urea. This addition product is then subjected to re-pulping in iso-octane at ambient temperature, after which it is filtered and decomposed by 12 litres of hot water. The organic layer is then recovered and the solvents are eliminated.

There is thus obtained 1 litre of extract enriched in n-paraffins, which contains about 20% of n-tridecane (n-$C_{13}$) which is isolated by the method described above.

For this purpose, this extract is fractionated by distillation and the fraction boiling between 222° and 244° C. is collected, which represents 23.07% of the extract and which contains 81.6% of n-$C_{13}$. Its composition is as follows in percentage by weight:

| | |
|---|---|
| Aromatics | 3.3 |
| Naphthenes | 6.8 |
| Total paraffins | 89.9 |
| | 100.0 | of which:

| | |
|---|---|
| n-$C_{12}$ | 1.8 |
| n-$C_{13}$ | 81.6 |
| n-$C_{14}$ | 0.7 |
| n-Paraffins | 84.1 |

This fraction is dissolved in twice its volume of methyl-ethyl-ketone, after which the solution obtained is cooled to $-27°$ C., at which temperature the crystallization of the n-tridecane is effected.

Finally, the crystallized product is subjected to re-pulping and to washing with fresh solvent with proportions of solvent (methyl-ethyl-ketone) of 5 and 1 vol./vol. of crystallized product respectively.

There are then collected 600 grams of n-tridecane with a purity of 98%.

What we claim is:

1. In a method for separating a particular desired one straight-chain paraffinic hydrocarbon having from 12 to 16 carbon atoms per molecule in substantially pure state from a mixture of hydrocarbons containing said one desired paraffin and at least one other substance from the group consisting of n-paraffins, iso-paraffins, naphthenes, aromatics, and mixtures thereof, the steps which comprise in combination distilling said mixture to obtain a narrow cut thereof consisting essentially of hydrocarbons having the same number of carbon atoms per molecule as said one desired paraffin and the largest percentage of said one desired paraffin obtainable from said mixture, concentrating said one desired paraffin in said narrow cut obtaining a fraction having at least a minimum percentage content by weight of said one desired paraffin, which minimum content is individually different for and characteristic of each of said 12–16 carbon paraffins and is approximately 60% for n-dodecane, 56% for n-tridecane, 50% for n-tetradecane, 35% for n-tentadecane, and 25% for n-hexadecane, and fractionally crystallizing said fraction after said concentrating step at a temperature of at least as high as $-30°$ C. for crystallizing out said one desired paraffin hydrocarbon from other said other hydrocarbons in said mixture in substantially pure state.

2. A method as claimed in claim 1, in which the narrow fraction collected after distillation has a boiling range of less than 8° C.

3. A method as claimed in claim 1, in which the fractional crystallization of the crystallized n-paraffinic product is carried out in the presence of organic solvents, selected from the group consisting of methyl-ethyl-ketone, dichloro-ethane and mixtures thereof.

4. A method as claimed in claim 1, in which the said desired n-paraffinic crystallized product is washed in the presence of organic solvents selected from the group consisting of methyl-ethyl-ketone, dichloro-ethane and mixtures thereof.

5. A method as claimed in claim 1, in which the fractional crystallization is carried out between $-20°$ C. and $-30°$ C.

6. A method as claimed in claim 1, in which after the crystallization, the filtrate is re-cycled into the charge.

7. A method as claimed in claim 1, and including the preliminary step of enriching the hydrocarbons mixtures in straight-chain paraffins by means of a treatment with urea.

8. A method as claimed in claim 1, and including the preliminary step of enriching the hydrocarbons mixtures in straight-chain paraffins by means of a treatment on molecular sieves.

9. A method as described in claim 1 in which said distillating and concentrating steps are combined in a single distillation step for obtaining the said narrow fraction having said minimum content by weight of the desired n-paraffin hydrocarbon.

10. A method as described in claim 2 in which the said boiling point range is less than 6° C.

11. A method as described in claim 5 in which the said fractional crystallization is carried out at a temperature between about −25° C. and −27° C.

References Cited

UNITED STATES PATENTS

| | | | |
|---|---|---|---|
| 1,951,780 | 3/1934 | Voorhees | 62—58 |
| 2,815,364 | 12/1957 | Green | 260—676 |
| 3,067,270 | 12/1962 | Weedman | 203—48 |

FOREIGN PATENTS

| | | |
|---|---|---|
| 525,388 | 8/1940 | Great Britain. |

DELBERT E. GANTZ, *Primary Examiner.*

HERBERT LEVINE, *Assistant Examiner.*